3,288,675
PARENTERAL SULFONAMIDE COMPOSITIONS AND PROCESSES
Harold Leon Newmark, Maplewood, and Raffaele Roncalli, South River, N.J., assignors to Hoffmann-La Roche Inc., Nutley, N.J., a corporation of New Jersey
No Drawing. Filed Mar. 20, 1964, Ser. No. 353,595
5 Claims. (Cl. 167—51.5)

The present invention relates to parenteral solutions and more particularly relates to parenteral solutions of $N^1$-(2,6-dimethoxy-4-pyrimidinyl)-sulfanilamide.

The intramuscular route of administration of sulfonamides is seldom used in human and veterinary practice because of the marked irritation often produced at the site of injection when the sulfonamide solution contains more than 15 percent sulfonamide. However, concentrated sulfonamide solutions for intramuscular use are highly desirable for certain indications, e.g., where the patient is unconscious or in the veterinary area for animal species such as swine, which are difficult or inconvenient to treat orally or intravenously. Also, where a large number of animals are to be treated with a controlled quantity of sulfonamide, a concentrated sulfonamide solution for intramuscular use would enable the rapid and convenient treatment of a large number of animals.

It has now been discovered that relatively concentrated solutions of $N^1$-(2,6-dimethoxy-4-pyrimidinyl)-sulfanilamide are substantially nonirritating upon intramuscular injection. They can also be employed intravenously, and hence are useful by either route according to the preference or requirement of the administration. Furthermore, the instant relatively concentrated solutions are in the form of the sodium salt of $N^1$-(2,6-dimethoxy-4-pyrimidinyl)-sulfanilamide, and are hence very simple to prepare.

The compositions of the invention have the following ranges of ingredients:

$N^1$-(2,6-dimethoxy-4-pyrimidinyl)-sulfanilamide _____ From about 30 to about 50 percent, preferably about 40 percent (w./v.).
Sodium hydroxide _____ Amount necessary to give a pH of about 9 to about 10.5, preferably about 10 to about 10.5.
Water, remainder (q.s.).

In addition to the above essential ingredients, one or more of the following ingredients can be employed:

(1) Solubilizing agent—
  (a) polyhydroxy aliphatic compound, or About 10 to about 35 percent, preferably about 20 percent (v./v.).
  (b) ethyl alcohol, or __ From about 10 to about 30 percent, preferably about 10 percent (v./v.).
  (c) dimethylacetamide From about 10 to about 30 percent, preferably about 10 percent (v./v.).

(2) Antibacterial preservative _____ From about 0.2 to about 2.5 percent, preferably about 1 percent (w./v.).

(3) Metal chelating agent _ From about 0.005 to about 0.1 percent, preferably about 0.01 percent (w./v.).

(4) Antioxidant _____ From about 0.05 to about 0.4 percent, preferably about 0.1 percent (w./v.).

The percent compositions given above are either weight per unit of volume (w./v.) for solids, or volume of a liquid dissolved per unit of volume of the solution (v./v.).

The polyhydroxy aliphatic solubilizing agent is preferably propylene glycol, although other pharmaceutically acceptable polyhydroxy aliphatic compounds can also be employed, e.g., glycerine, polyethylene glycol 300, polyethylene glycol 400, etc.

The antibacterial preservative is preferably benzyl alcohol, although other pharmaceutically acceptable antibacterial preservatives can also be employed, e.g., phenol, cresol, etc. However, when either phenol or cresol is employed, the amount thereof in the solution should not be above about 0.5 percent (w./v.).

The metal chelating agent is preferably the disodium dihydrogen salt of ethylene diamine tetraacetic acid (EDTA), or other pharmaceutically acceptable salt of EDTA, although other pharmaceutically acceptable sequestering or chelating agents can also be employed, such as diethanolamine, triethanolamine, diethylene triamine pentaccetic acid and pharmaceutically acceptable alkali metal salts thereof, 1,2-diaminocyclohexane-N,N'-tetraacetic acid and pharmaceutically acceptable alkali metal salts thereof, etc.

The antioxidant employed is sodium formaldehyde sulfoxylate, although other nontoxic pharmaceutically acceptable antioxidants can also be employed, such as sodium bisulfite, sodium sulfite, sodium thiosulfate, monothioglycerol, etc.

The instant invention also encompasses the process of administering the compositions of the invention intramuscularly to the animal body. The total quantities of parenteral solutions of the invention which can be injected vary according to the species of the animal, its age, general condition of health, severity and type of infection, etc. For humans, an adult dose ranging from about 0.5 ml. to about 3.0 ml. of a solution of 40 percent w./v. of $N^1$-(2,6-dimethoxy-4-pyrimidinyl)-sulfanilamide can be employed, although it should be understood that these ranges are in no sense critical and the dosages can be adjusted either up or down. For lower animal use, from about 0.03 ml. to about 0.15 ml./lb. of body weight can be employed, preferably about 0.06 ml./lb. of the above 40 percent solution. Of course, where solutions having concentrations of $N^1$-(2,6-dimethoxy-4-pyrimidinyl)-sulfanilamide greater or less than 40 percent within the teaching of the invention are employed, the above quantities of solution are adjusted accordingly.

Another advantage of the compositions of the invention is that effective blood levels of $N^1$-(2,6-dimethoxy-4-pyrimidinyl)-sulfanilamide are obtained from intramuscular injection, and one dose per day is normally adequate.

The instant compositions are useful in the treatment of bacterial and protozoan diseases in the same manner as known dispensing forms of $N^1$-(2,6-dimethoxy-4-pyrimidinyl)-sulfanilamide.

The invention will be better understood from a consideration of the following examples which are given for illustration purposes only and are not meant to limit the invention.

*Example 1*

Three healthy male calves (two Angus and one Holstein-Friesian), which were all two to three weeks old, were fed a food concentrate and hay ad libitum. Drinking water was accessible to all of the animals. The calves were maintained in separate pens. After the animals were weighed, $N^1$-(2,6-dimethoxy-4-pyrimidinyl)-sulfanilamide having the following composition:

| Component: | Amount per ml. of solution |
|---|---|
| $N^1$ - (2,6 - dimethoxy-4-pyrimidinyl)-sulfanilamide _____mg__ | 370 |
| Propylene glycol, U.S.P. _____ml__ | 0.20 |
| Disodium ethylene diamine tetraacetate __mg__ | 0.1 |
| Sodium formaldehyde sulfoxylate _____mg__ | 1.0 |
| Sodium hydroxide, q.s. to pH 10. | |
| Water by injection, q.s. to 1.0 ml. | | was given intramuscularly at the following dosages:

| Calf No. | Weight in lbs. | Approximate Dosage of $N^1$-(2,6-dimethoxy-4-pyrimidinyl)-sulfanilamide, mg./lb. of b.w. | Total drug given (mg./head) | Approx. volume of solution injected, cc. |
|---|---|---|---|---|
| 1 | 104 | 25 | 2,600 | 7.0 |
| 2 | 116 | 25 | 2,900 | 7.8 |
| 3 | 138 | 50 | 6,900 | 18.6 |

The common site for injection was the lateral gluteal area (biceps femoris muscle). Blood samples were obtained by jugular puncture and oxalated according to the standard procedure. Blood samples were withdrawn prior to the drug administration and at intervals of 4 and 24 hours after the administration of the above drug composition. All the sulfonamide analyses in the whole blood and plasma were carried out according to the method of Bratton-Marshall (Bratton, A. C. and Marshall, E. K., Journal of Biological Chemistry, 128: 537–550; 1939) using a Beckman DU spectrophotometer at wave length 550 m$\mu$. Standard curves for whole blood and plasma were prepared by adding known amounts of $N^1$-(2,6-dimethoxy-4-pyrimidinyl)-sulfanilamide to each fluid and carrying them through the standard procedure. The whole blood and plasma levels of $N^1$-(2,6-dimethoxy-4-pyrimidinyl)-sulfanilamide for the 25 mg. dosage obtained after 4 hours were 7.47 and 13.3 mg./100 ml. (average for calves 1 and 2) and 14.2 and 19.7 mg./100 ml. for the 50 mg. dosage level (calf 3). After 24 hours the whole blood and plasma concentrations were 2.40 and 4.13 mg./100 ml. for the 25 mg. dosage level (average of calves 1 and 2) and 4.32 and 7.92 mg./100 ml. for the 50 mg. dosage level (calf 3).

No side effects were noted, i.e., no tissue necrosis, edema, lameness, etc.

*Example 2*

A male domestic cat, eight years old, weighing 11 pounds and having a deep muscular abscess produced by a bite, was treated with the same composition given in Example 1 according to the following dosage schedule: 0.69 cc. the first day and 0.34 cc. on each of the following two days by intramuscular administration. The animal was cured of the abscess without any side effects.

*Example 3*

A female poodle, two years old, weighing 5 pounds, having an anal gland abscess, was treated with the composition of Example 1 according to the following dosage schedule: 0.31 cc. on the first day and 0.16 cc. on the following day by intramuscular administration. The animal was cured of the abscess without any side effects.

The instant formulations are particularly useful for humans and animals weighing about 150 lbs. or less, such as sheep, goats, swine, and calves since an effective sulfonamide dose can be administered to them in a single injection. Of course, the instant formulations can also be employed for larger animals such as cattle, although multiple injections may be necessary.

We claim:
1. An aqueous composition for intramuscular injection comprising
   (a) from about 30 to about 50 percent w./v. of $N^1$-(2,6-dimethoxy-4-pyrimidinyl)-sulfanilamide;
   (b) from about 10 to about 35 percent v./v. of a solubilizing agent selected from the group consisting of propylene glycol, glycerine, polyethylene glycol 300, polyethylene glycol 400, ethyl alcohol, and dimethylacetamide;
   (c) from about 0.2 to about 2.5 percent w./v. of a pharmaceutically acceptable antibacterial preservative selected from the group consisting of benzyl alcohol, phenol and cresol;
   (d) from about 0.005 to about 0.1 percent w./v. of a salt of ethylenediamine tetraacetic acid;
   (e) from about 0.05 to about 0.4 percent w./v. of a pharmaceutically acceptable antioxidant selected from the group consisting of sodium formaldehyde sulfoxylate, sodium bisulfite, sodium sulfite, sodium thiosulfate and monothioglycerol;
   (f) sufficient sodium hydroxide to give a pH of from about 9 to about 10.5; and
   (g) the remainder water.
2. A composition according to claim 1 wherein the solubilizing agent is propylene glycol, the antibacterial preservative is benzyl alcohol, the chelating agent is disodium dihydrogen ethylene diamine tetraacetate, and the antioxidant is sodium formaldehyde sulfoxylate.
3. A process for treating an animal comprising administering intramuscularly to said animal a therapeutically significant quantity of a composition of claim 1.
4. An aqueous composition for intramuscular injection comprising
   (a) about 40 percent w./v. of $N^1$-(2,6-dimethoxy-4-pyrimidinyl)-sulfanilamide;
   (b) about 20 percent v./v. of propylene glycol;
   (c) about 1 percent w./v. of benzyl alcohol;
   (d) about 0.01 percent w./v. of disodium dihydrogen ethylene diamine tetraacetate;
   (e) about 0.1 percent w./v. of sodium formaldehyde sulfoxylate;
   (f) sufficient sodium hydroxide to give a pH of from about 10 to about 10.5; and
   (g) the remainder water.
5. A process for treating an animal comprising administering intramuscularly to said animal a therapeutically significant quantity of a composition of claim 4.

References Cited by the Examiner

UNITED STATES PATENTS

| 2,566,038 | 8/1951 | Sieger | 167—51.5 |
| 2,582,147 | 1/1952 | Mourer et al. | 167—51.5 |
| 2,783,178 | 2/1957 | White | 167—51.5 |
| 3,041,237 | 6/1962 | Hoff et al. | 167—51.5 |
| 3,214,335 | 10/1965 | Diedrich | 167—58.1 |

OTHER REFERENCES

Merck Index: 7th Edition, published by Merck and Co., Inc., Rahway, N.J., 1960, pp. 992–993.

LEWIS GOTTS, *Primary Examiner.*

RICHARD L. HUFF, *Assistant Examiner.*